Figure 1:
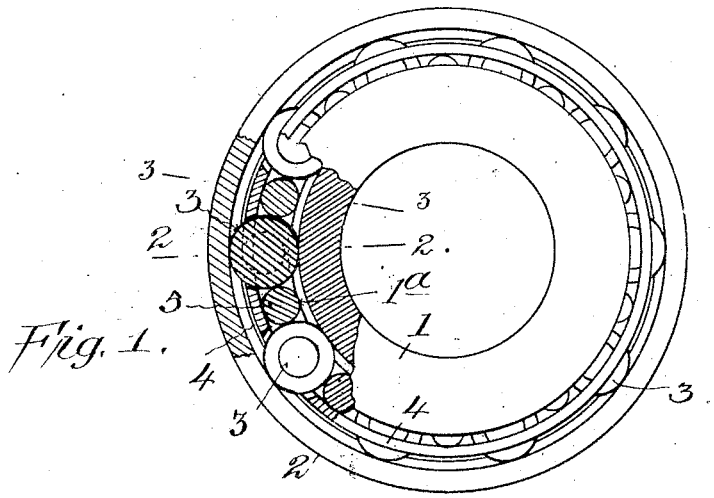

C. UPTON.
ANTIFRICTION BEARING.
APPLICATION FILED JUNE 8, 1911.

1,003,551.

Patented Sept. 19, 1911.

2 SHEETS—SHEET 1.

Witnesses:

Inventor
Colcord Upton,
By his Attorney
T. F. Bourne

C. UPTON.
ANTIFRICTION BEARING.
APPLICATION FILED JUNE 8, 1911.

1,003,551.

Patented Sept. 19, 1911.

2 SHEETS—SHEET 2.

Witnesses:

Inventor:
Colcord Upton
T. F. Bourne
attorney.

UNITED STATES PATENT OFFICE.

COLCORD UPTON, OF BALTIMORE, MARYLAND, ASSIGNOR TO SIMPLEX ROLLER BEARING COMPANY, OF NEW YORK, N. Y., A CORPORATION OF NEW YORK.

ANTIFRICTION-BEARING.

1,003,551.  Specification of Letters Patent.  Patented Sept. 19, 1911.

Application filed June 8, 1911. Serial No. 631,913.

*To all whom it may concern:*

Be it known that I, COLCORD UPTON, a citizen of the United States, and resident of Baltimore city and State of Maryland, have invented certain new and useful Improvements in Antifriction - Bearings, of which the following is a specification.

My invention relates to improvements in the type of anti-friction bearings comprising inner and outer concentric faces or members and rolling members therebetween, and the object of my invention is to provide a simple and efficient bearing which shall be cheap to manufacture, capable of ready assembling of parts, and durable in use.

My invention comprises inner and outer concentric races or members, the inner race being provided with a peripheral groove or raceway adapted to receive working rollers or rolling members and annular bearing surfaces at the sides of said groove, and radially disposed retaining flanges without said surfaces, working rollers within said groove between the races, separator rolls between the working rollers and bearing upon said side surfaces between said radial flanges, and a retainer in ring-like form provided with openings receiving the working rollers and adapted to fit over the separator rolls to retain them upon the inner race, the outer race having a bearing surface to receive said working rollers.

The separator rolls interposed between the working rollers keep the latter all properly spaced apart at all times, and at least one of the openings in the retainer is of such dimensions that one of its edges will contact with the corresponding working roller projecting through such opening in either direction of travel of the rollers around the raceway to cause such roller to carry the retainer along with it, but the other openings in the retainer are larger than such first-named opening so that the edges of said openings will not contact with the corresponding rollers projecting through such openings, whereby the retainer is not required to aline the working rollers or keep them in alinement, but is merely used to restrain radial movement of the separator rolls, by which means friction between the working rollers and the retainer is materially reduced. While I have referred to one of the openings in the retainer being relatively small with respect to the other openings in the retainer for the purpose stated, it will be understood that two or more of such openings diametrically or symmetrically disposed around the races may be sufficiently small to contact with the corresponding working rollers while the other openings are sufficiently large not to contact at their edges with the corresponding rollers, and thereby to balance the weight of the retainer.

Figure 2:
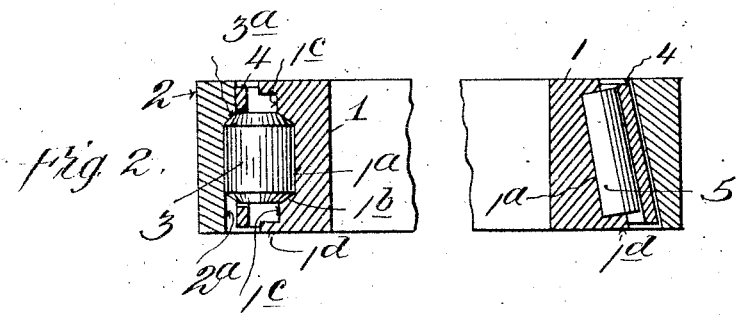
Figure 5:
Figure 3:
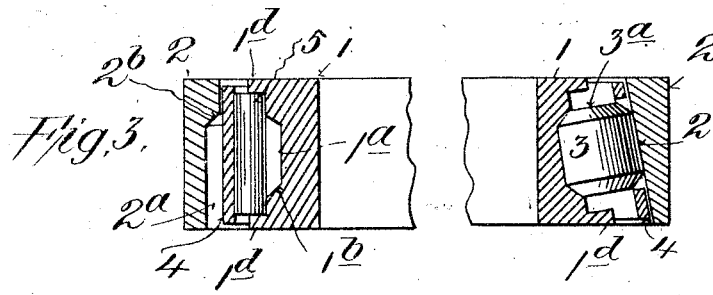
Figure 6:
Figure 4:
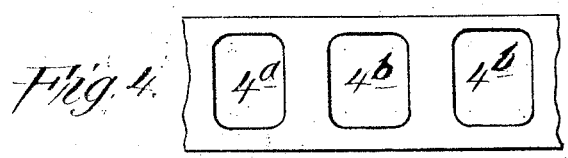
Figure 7:
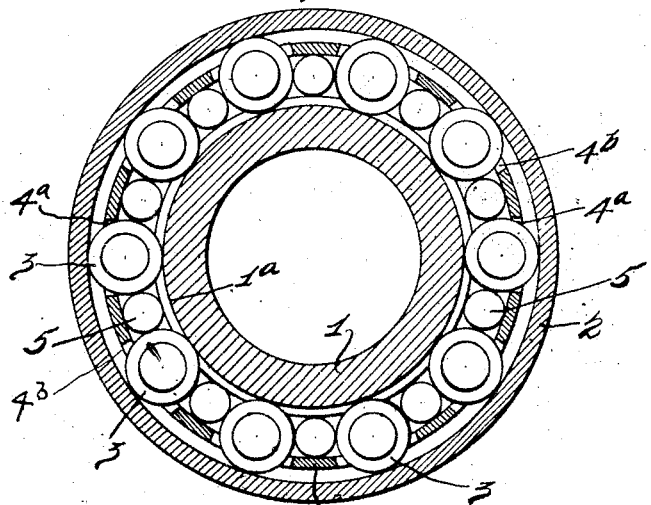
Figure 8:
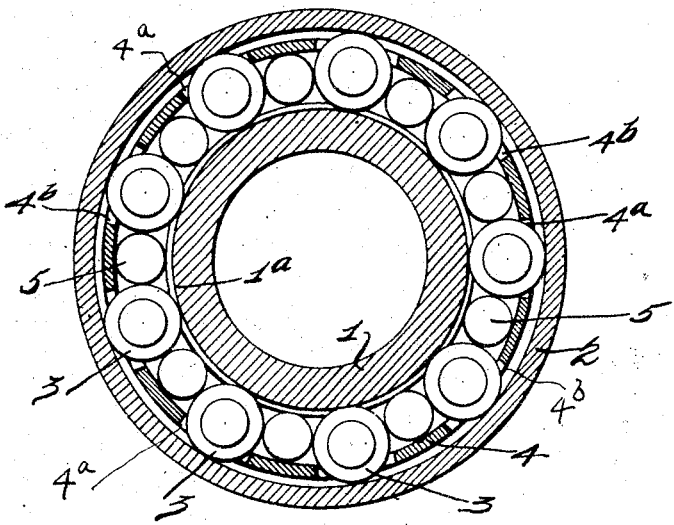
Figure 9:
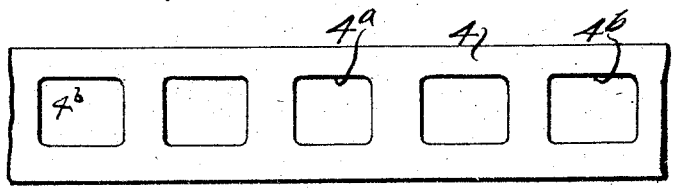

Reference is to be had to the accompanying drawings forming part hereof, wherein, Figure 1 is a face view of an anti-friction bearing embodying my invention, part being broken away; Fig. 2 is a detail section on the line 2, 2, in Fig. 1; Fig. 3 is a similar view on the line 3, 3, in Fig. 1; Fig. 4 is a detail face view of part of the retainer ring; Fig. 5 is a view corresponding to Fig. 3, adapted as a cone-type bearing, Fig. 6 is a view similar to Fig. 2 of the cone-type bearing. Figs. 7 and 8 are sectional views illustrating different forms of openings in the retainer, and Fig. 9 is a face view illustrating the retainer according to Fig. 7.

In the drawings the numerals 1, 2, indicate respectively inner and outer concentric races or members, suitably spaced apart to receive between them the working rollers or rolling members 3. The inner race 1 is provided with a peripheral groove or raceway $1^a$, shown provided with outwardly inclined or beveled edge portions $1^b$ and with peripheral wearing faces $1^c$ on opposite sides of the beveled portions $1^b$, and with the opposed radially disposed flanges or walls $1^d$ outside of the surfaces $1^c$. Rollers 3 are shown provided with beveled ends $3^a$, the circular portions of said rollers fitting the groove $1^a$ and the beveled parts $3^a$ of the rollers fitting the beveled faces $1^b$, the rollers also bearing against the wearing surface $2^a$ of the outer race 2, the latter having the beveled surface $2^b$ adjacent one end.

At 4 is a ring-like retainer provided with openings 4ᵃ through which the working rollers 3 project.

5 indicates separator rolls that bear upon the annular surfaces 1ᶜ and whose ends aline with the radial flanges 1ᵈ, whereby said rolls are fitted to rotate upon race 1 and are retained from endwise displacement by the radial flanges 1ᵈ, the retainer 4 fitting over the separator rolls and preventing radial outward movement thereof.

At least one of the openings 4ᵃ in the retainer is of such dimensions as to contact with the corresponding working roller projecting through the same so that in either direction of travel of the working rollers around the races the retainer 4, by the above named roller, will be carried around with the rollers, but other openings 4ᵇ of the retainer are made larger in the direction of the circumference of the retainer than said opening 4ᵃ so that the working rollers projecting therethrough will not be in contact with the transverse edges of said openings, but are held spaced therefrom by the retainer rolls, and thereby the retainer is not required to aline the working rollers or keep them in alinement, but restrains the radial movement of the separator rolls, friction between the working rollers and the retainer being thereby materially reduced. While one of the openings 4ᵃ may be of the size stated it will be understood that diametrically opposed openings may be so arranged while the other openings 4ᵇ are larger, as shown in Fig. 7, or three of such openings 4ᵃ spaced at 120° apart may be of the size stated and the other openings 4ᵇ of a larger size, as illustrated in Fig. 8, whereby the weight of the retainer is balanced.

In assembling the parts the separator rolls 5 are placed upon the inner race 1, the retainer 4 is slipped over the same, the working rollers 3 are then passed through the openings 4ᵃ, 4ᵇ of the retainer between the adjacent pairs of separator rolls 5, and then the outer race 2 is slipped over such assembled parts.

In Figs. 5 and 6 the construction is similar to that above described, excepting that the wearing surfaces 1ᵃ and 2ᵃ are at an angle to or tapered with respect to the axis of the races 1, 2, the retainer 4 being correspondingly shaped whereby a cone-type bearing is provided.

Having now described my invention what I claim is:—

1. An anti-friction bearing comprising inner and outer concentric race rings having races, the inner race ring having a peripheral groove and being provided with annular wearing surfaces at the sides of said groove, said inner race ring having radial flanges without said annular surfaces and spaced apart, working rollers between the race rings and located in said groove, separator rolls between the working rollers and bearing against said annular surfaces, and a retainer encircling said separators and having openings spaced apart on opposite sides of the separators through which the working rollers project.

2. An anti-friction bearing comprising spaced concentric race rings having races, the inner race ring having a peripheral groove and outwardly inclined edge portions at the sides of said groove, said race ring also having annular wearing surfaces on opposite sides of said inclined edge portions and radially disposed flanges spaced apart at the outer edges of said annular surfaces, working rollers having beveled edges at their ends located in said peripheral groove, the beveled edges of the rollers coacting with said inclined edge portions, separator rolls between the working rollers and bearing against said annular surfaces, said separator rolls being interposed between said radial flanges, and a retainer encircling said separator rolls, said retainer having spaced openings through which said working rollers pass into coaction with the outer race.

3. An anti-friction bearing comprising inner and outer spaced race rings having races, working rollers between said race rings, means for retaining said rollers in operative position between said race rings, separator rolls between the race rings and between the working rollers, and a retainer encircling the separator rolls, said retainer being provided with openings through which the working rollers project, the transverse edges of one of said opening being in position to engage the corresponding working roller, other of said openings of said retainer being wider in the direction of travel of the retainer than said first named opening, the working rollers of the larger openings being held out of engagement with the transverse edges of said openings by the corresponding separator rolls.

4. An anti-friction bearing comprising inner and outer concentric race rings having races, the inner race ring having a peripheral groove and being provided with annular wearing surfaces at the sides of said groove, inner race ring having radial flanges without said annular surfaces and spaced apart, working rollers between the race rings in said groove, separator rolls between the working rollers and bearing against said annular surfaces, said radial flanges limiting endwise movement of said separator rolls, and a retainer encircling the separator rolls, said retainer being provided with openings through which the working rollers project, the transverse edges of one of said openings being in position to engage the corresponding working roller, other of said openings of said retainer being wider in the direction of travel of the retainer than said first named opening, the working rollers of the larger openings being held out of engagement with the transverse edges of said openings by the corresponding separator rolls.

Signed at New York city, in the county of New York, and State of New York, this 6th day of June, A. D. 1911.

COLCORD UPTON.

Witnesses:
 T. F. BOURNE,
 RALPH H. RAPHAEL.